United States Patent [19]
Dey-Sarkar et al.

[11] Patent Number: 5,440,525
[45] Date of Patent: Aug. 8, 1995

[54] SEISMIC DATA HYDROCARBON INDICATOR

[75] Inventors: Samir K. Dey-Sarkar; Douglas J. Foster, both of Plano; Steven W. Smith, Houston; Herbert W. Swan, Richardson, all of Tex.

[73] Assignee: Atlantic Richfield Company, Los Angeles, Calif.

[21] Appl. No.: 140,913

[22] Filed: Oct. 25, 1993

[51] Int. Cl.6 ............................ G01V 1/36; G01V 1/34
[52] U.S. Cl. .......................................... 367/52; 367/21; 367/47; 367/70; 364/421
[58] Field of Search ...................... 367/15, 21, 47, 52, 367/70; 364/421; 382/53

[56] References Cited

U.S. PATENT DOCUMENTS

| | | | |
|---|---|---|---|
| 4,570,246 | 2/1986 | Herkenloff et al. | 367/68 |
| 4,972,384 | 11/1990 | Williams | 367/75 |
| 4,995,007 | 2/1991 | Corcoran et al. | 367/52 |
| 5,251,286 | 10/1993 | Wiener et al. | 364/422 |
| 5,258,960 | 11/1993 | Swan | 367/47 |
| 5,297,108 | 3/1994 | Swan | 367/52 |

OTHER PUBLICATIONS

Dey-Sarkar et al, SEG Invest. Geophys. Ser. No. 8, pp. 57–77, 1993; abst. only herewith.
Castagna et al, 63rd Annu. SEG Mtg, Sep. 26, 1993, pp. 734–737; Ppwe No. SL2-3; abst. only herewith.
Walden, A. T.; Gegebysical Prospecting, vol. 39, N7, Oct. 1991, pp. 915–942; abst. herewith.
Treadgold et al, 60th Annu SEG Int. Mtg. Sep. 23, 1990 V. 2, pp. 1463–1466; abst. herewith.
Swan, H. W., "Properties of Direct AVO Hydrocarbon Indicators"; pp. 78–92 of *Offset Depth Relectivity: Theory and Practic AVO Analysis;* edited by Castagna and Backus; 1993, Society of ExplorationGeophysicists.
Chang, et al., "Resolving an Interpretation Ambiguity via Application of Seismic Tomography"; Expanded Abstracts of 61st Annual International Meeting of Society of Exploration Geophysicists; Nov. 10–14, 1991; pp. 203–206.
Swan, H. W., "Noise Sensitivity of Linear Seismic Inversion", S13.3; Expanded Abstracts with Biographies, 1993 Technical Program, 63rd Annual Meeting and International Exhibition, Sep. 26–30, 1993/Washington, D.C. pp. 1177–1180.
Foster, et al.; "A Closer Look at Hydrocarbon Indicators"; SL2.2; Expanded Abstracts with Biographies, 1993 Technical Program, 63rd Annual Meeting and International Exhibition, Sep. 26–30, 1993/Washington, D.C.; pp. 731–733.

*Primary Examiner*—Nelson Moskowitz
*Attorney, Agent, or Firm*—Albert C. Metrailer

[57] ABSTRACT

A method for displaying seismic data to provide direct indications of the presence of hydrocarbons. Seismic data is processed using conventional amplitude versus offset techniques to obtain zero offset reflectivity, or A, traces and the amplitude versus offset slope, or B, traces. AB cross plots of each trace are then generated. Each sample point on the cross plot is then assigned a value corresponding to its deviation from the regression line of the cross plotted AB points. The assigned values are then plotted in their corresponding time sample positions to generate a trace or display providing a direct indication of hydrocarbons.

7 Claims, 3 Drawing Sheets

SEISMIC DATA HYDROCARBON INDICATOR

BACKGROUND OF THE INVENTION

This invention relates to the use of seismic data, and more particularly the use of amplitude versus offset, AVO, analysis of seismic data, to generate direct indicators of the presence of hydrocarbons in subsurface earth formations.

In conventional seismic prospecting, acoustic energy is applied to the earth's surface. As the energy travels downward, it is reflected from subsurface interfaces back to the earth's surface. The amplitude of the reflected energy is normally recorded in the form of a series of time samples. By plotting these amplitudes versus a time scale, a representation of the locations and shapes of the subsurface interfaces is generated. The depths of the various interfaces correspond generally to the time of arrival of the various signals.

Seismic prospecting has been improved by techniques such as the common depth point, CDP, or common midpoint, CMP, techniques to improve signal to noise ratio. In these methods, seismic signals are generated sequentially at each of a number of points along the seismic prospecting path while reflections are recorded at all the points following the generation of each signal. The recorded signals are then organized into gathers of traces, each corresponding to a common depth point or common midpoint. That is, all of the traces in the gather result from source receiver pairs equally spaced about the point in question along the prospect path. By properly combining all of the signals corresponding to a CDP, the signal to noise ratio is improved.

Various attempts have been made to analyze CDP data in order to estimate various characteristics of the subsurface formations which may be used to predict the hydrocarbon bearing potential thereof. One important method is known as the amplitude versus offset, AVO, technique in which the variation in amplitude of signals reflected from a given subsurface interface is analyzed for changes relating to the angle of incidence or offset between source receiver pairs. It is generally believed that the presence of hydrocarbons in a subsurface formation causes an increase in the change in amplitude as a result of offset. Improvements on the AVO techniques have resulted in the generation of what are believed to be direct indicators of the presence of hydrocarbons in subsurface formations. However, testing of these methods in areas with known hydrocarbon bearing layers has shown that current methods often fail to identify important hydrocarbon bearing zones.

SUMMARY OF THE INVENTION

In accordance with the present invention, we have discovered that AVO processing of seismic data can be used to generate displays which more accurately indicate the presence of hydrocarbons in subsurface formations. In the present invention, seismic data is first processed to obtain zero offset reflectivity, or A, traces and amplitude versus offset slope, or B, traces, according to the conventional AVO processing practice. The A and B traces corresponding to a selected CDP location are then cross plotted against each other. The average regression line of the cross plotted A and B traces is then determined. Each point on the cross plot corresponds to a given time sample value and is assigned a value proportional to the deviation of that point from the average regression line. The points with greatest deviation have the highest likelihood of indicating the presence of hydrocarbons. The deviation values may then be plotted in their sequential time sample positions to provide a display indicating the probability of the presence of hydrocarbon reserves in the subsurface formations being investigated.

DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

Figure 1:
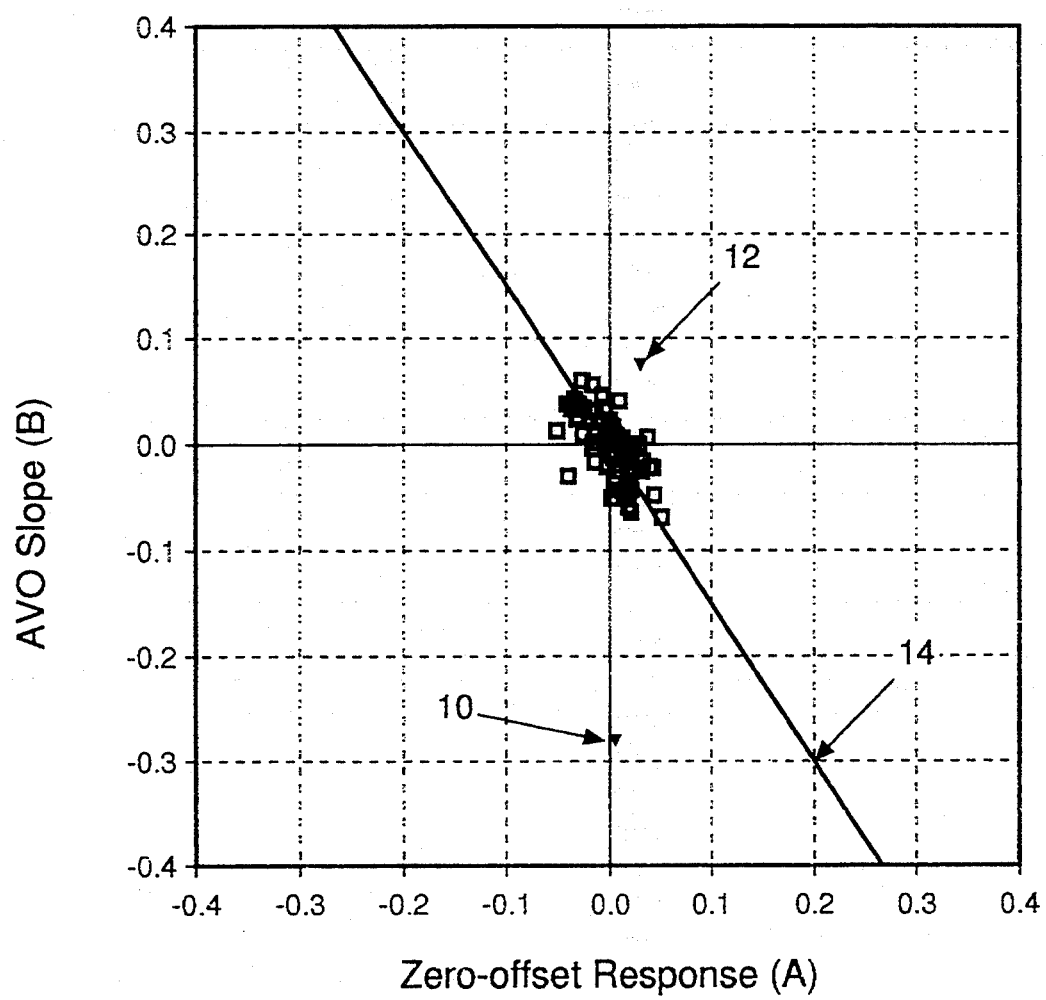
FIG. 1 is an illustration of an AB cross plot derived from well log measurements.

The two most commonly used AVO characteristics are the zero offset reflectivity, denoted by the letter A, and the AVO gradient or slope denoted by the letter B. The A trace represents the strength of the reflected signal where the location of the receiver matches that of source. The B trace represents the rate at which the reflected signal amplitudes vary relative to the squared sine of the incident angle. As noted above, interfaces between formations which contain hydrocarbons are believed to cause larger B values than those which do not. Thus, it would seem that the B trace itself could be used as a direct indicator of the presence of hydrocarbons, however as discussed in the next paragraph this has worked in practice only if certain correlations are made with the A trace. While conventional seismic data, and the A trace resulting from AVO prospecting, indicate subsurface structure, that is, the interfaces between rock layers of differing types, they do not indicate whether any of the layers contain hydrocarbons.

The most common method of using AVO processing to directly indicate the presence of hydrocarbons is based on the theory that there should be some correlation between the A and B traces which directly indicates the presence of hydrocarbons. Larger values of the A trace would indicate the presence of an interface and it is assumed that a corresponding large value of B trace would indicate the presence of hydrocarbons at the interface. Mathematically this analysis has been performed by looking for positive values of the AB product. Our studies have indicated that the AB product quite often fails to identify interfaces where hydrocarbons are present. In fact, interfaces of hydrocarbon bearing layers often exhibit a negative AB product.

In order to better understand the relationship between the A and B curves and to determine any relationship which could be used to better display seismic data for directly indicating hydrocarbons, we have studied relationships between various well log and petrophysical data. It is known that there is an approximately linear relationship between seismic pressure wave velocity, or P-Wave velocity, and density in fluid saturated rock where hydrocarbons are absent. See Gardner et al. (1974, Formation Velocity And Density—The Diagnostic Basics For Stratigraphic Traps:

*Geophysics,* vol. 39,.770-780). Likewise it is known that there exists a similar linear relationship between the P-wave velocity and seismic shear wave velocities, or S-wave velocities, in such fluid saturated rocks. See Castagna et al, (1985, Relationships Between Compressional And Shear Wave Velocities In Clastic Silicate Rocks; *Geophysics,* vol. 50, 571-581). These two linear relationships among P and S velocities and density can be translated into a linear relationship between A and B as follows.

Equation 1:

$$B = \frac{A}{1 + \beta V_p/\rho} \left[ 1 - \left( \frac{4\beta V_p}{\rho} + \frac{8}{\alpha} \frac{V_p}{V_s} \right) \left( \frac{V_s}{V_p} \right)^2 \right]$$

where $\rho$ is the average density, $V_p$ and $V_s$ are the average P and S wave velocities, $\beta$ is the slope of the linear relationship between P velocity and density (Gardner's relation), and $\alpha$ the slope of the linear relationship between P and S velocities (Castagna's relation). What this means is that, in the absence of hydrocarbons, there is a correlation between A and B. This correlation results in a linear trend in the A-B plane.

Reference to FIG. 1 illustrates this correlation and also illustrates a problem with prior art hydrocarbon indicators. FIG. 1 is a cross plot of A and B values at various depth locations generated from well log data. Since this is an actual well, the actual location of a gas field zone is known and samples 10 and 12 corresponding to the upper and lower interfaces of this zone are identified. Based on measured values and the equation set out above, the average AB value is expected to have a regression line slope on the AB cross plot of 31°. The actual value obtained by plotting an average slope of the points shown in FIG. 1 as indicated by line 14, is at 33°. The two sample points 10 and 12, which should indicate the presence of hydrocarbons have the greatest deviation from the regression line of all sample points plotted. Conventional analysis, which assumes that only positive AB products indicate the presence of hydrocarbons, would have clearly missed sample point 10, since its AB product is negative. Sample point 12 is very close to the B axis and thus, while the product is positive, it would have a very small value and might not be identified as an indicator of hydrocarbons.

We believe that a more appropriate method for indicating the presence of hydrocarbons is to assign values to each depth sample point, or in the case of seismic data, each time sample point, a value corresponding to the deviation of each sample point from the average regression line 14. In FIG. 1, this would have assigned the greatest hydrocarbon indicator values to sample 10 which by conventional analysis would have been ignored as having a small negative value. The second greatest value would have been assigned to sample 12. Thus, both upper and lower boundaries of the known gas zone would have been identified properly by this technique.

Figure 2:
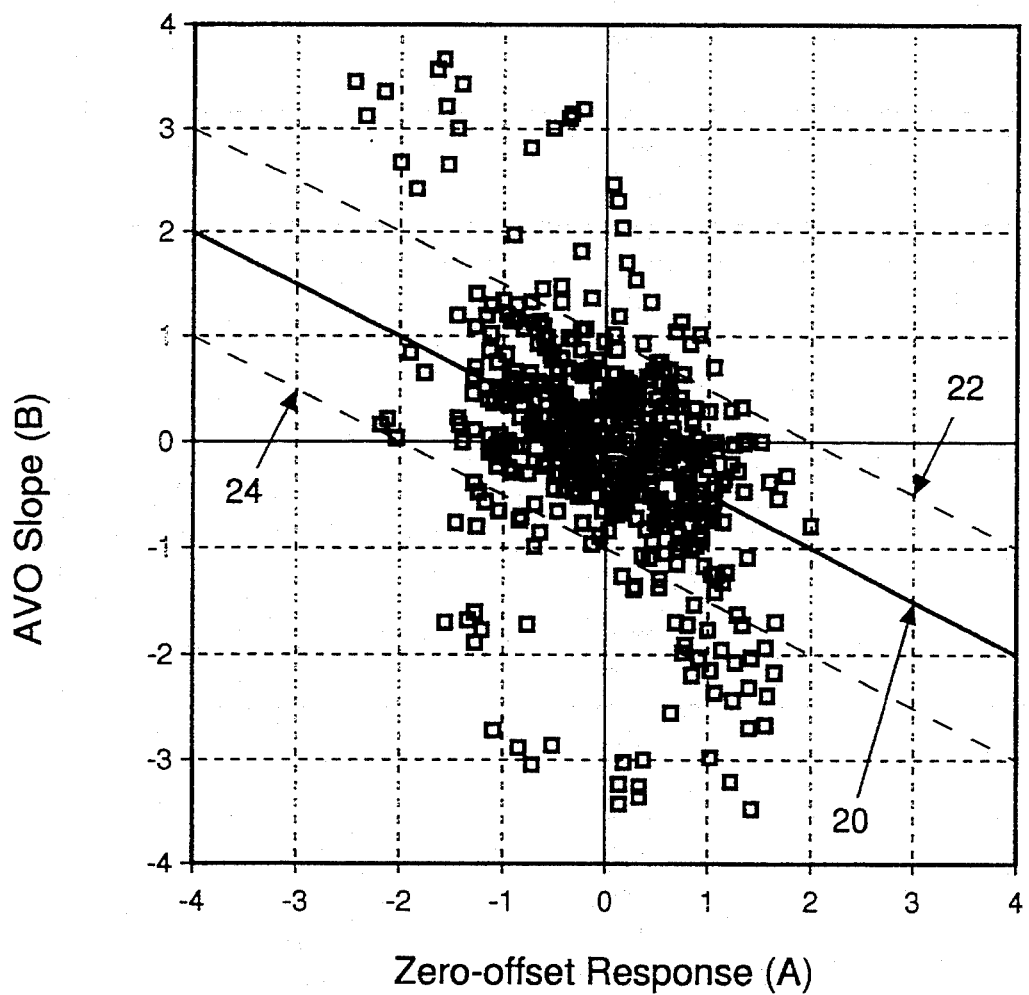
FIG. 2 is an illustration of an AB cross plot derived from actual seismic data.

With reference to FIG. 2, there is illustrated a cross plot of AB values obtained from AVO processing of actual seismic data. Each point on the cross plot represents the A and B curve value which correspond to a given time sample point, or corresponding depth point. Most of the points are clustered fairly closely to the regression line 20. It is generally a good assumption that only a very small percentage of depth sample points would correspond to earth layers which contain hydrocarbon deposits. The vast majority of layers do not contain hydrocarbons. Thus, the regression line 20 corresponds to non-hydrocarbon layers. In FIG. 2, a number of sample points are outside the central cluster, that is, deviate from the regression line 20 significantly. However, a majority of the points with significant deviations from line 20 appear in the upper left and lower right quadrants of the AB cross plot. All of these points would have a negative AB product and thus would have been ignored by the most commonly used method for direct indications of hydrocarbons in AVO processing. In the present invention, it is the mere fact that these points deviate significantly from the regression line 20 which causes them to be assigned values indicating the presence of hydrocarbons.

Figure 3:
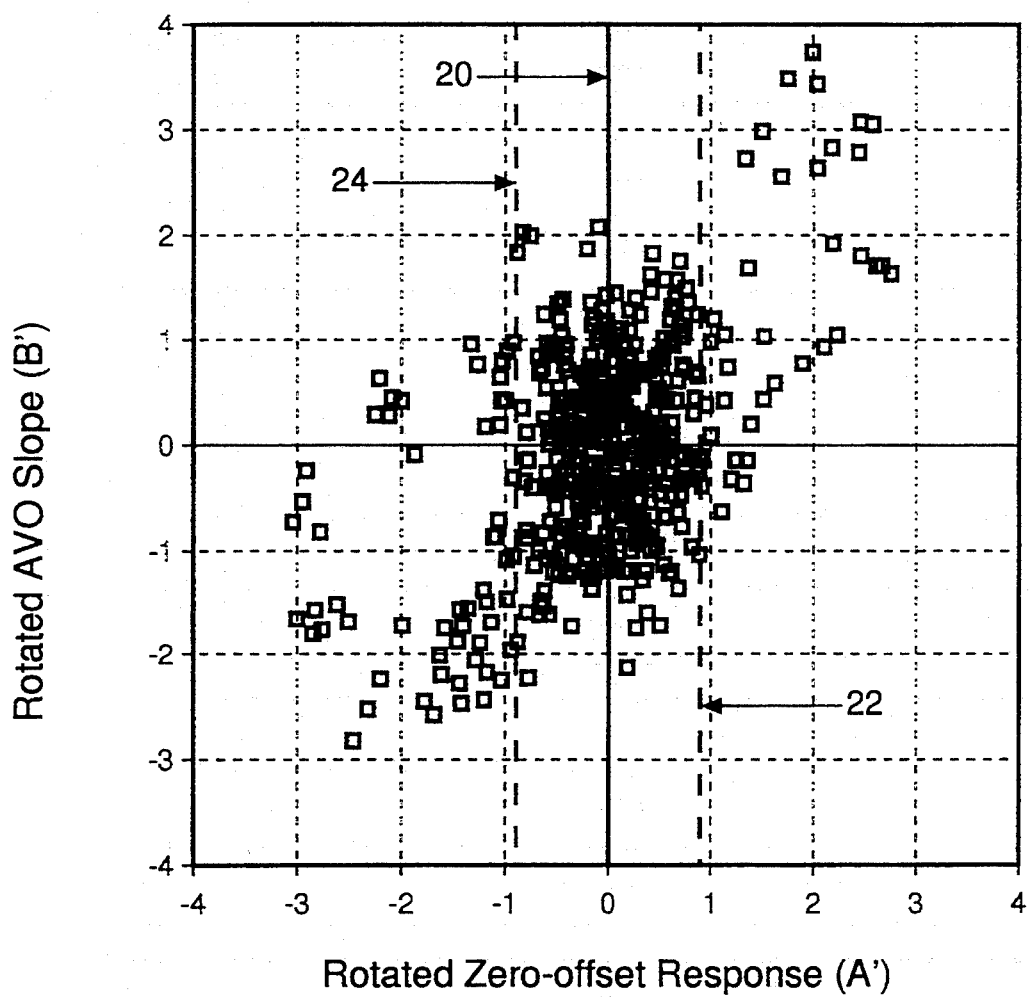
FIG. 3 is an illlustration of the same AB cross plot shown in FIG. 2, in which the data has been rotated to illustrate an alternate embodiment of the present invention.

With reference to FIG. 3, the data of FIG. 2 is replotted to illustrate an alternate analysis and interpretation technique. The data of FIG. 2 has been rotated about the origin so that the regression line 20 lies on or coincides with the B axis. When viewed this way we have found another characteristic of data points which directly indicates the presence of hydrocarbons. Those points which are in the upper right and lower left quadrants of the plots are most likely to indicate hydrocarbons. Those found in the other two quadrants are less likely to indicate hydrocarbons. It is apparent that this is similar to the criteria used to select points in the prior art methods which used the positive AB product as a direct indicator. After using the rotation step, prior known methods for assigning values and displaying the selected points may be used if desired. This may be useful where automated display methods have already been developed.

We believe that the hydrocarbon detection method described herein works best when quadrature components of the B trace are removed. These components have little relationship to the AVO characteristics of the rock interfaces in question. This is because the incidence angles which result from the vast majority of seismic acquisition geometries are less than the critical angle of total reflection. A seismic wave reflected from an interface at an angle less than the critical angle will not change its phase, except perhaps by a complete phase reversal. Thus, we do not expect there to be any sizable quadrature components in the AVO slope. If there are, they are most likely due to velocity errors in the NMO correction process, or to non-reflective components present in the seismic data such as surface waves.

In order to remove the quadrature component, the analytic or complex traces for each of the A and B traces must first be calculated. Seismic traces were first represented by Taner, et al. as the real part of the analytic signal or complex trace. See the publication by Taner, et al. "Complex Seismic Trace Analysis" Geophysics, Volume 44, No. 6 (June 1979) pages 1041-63. Each analytic trace is comprised of a real part, measured from the seismic data via a least squares fit, and an imaginary part, computed from the real part, via the Hilbert transform. The analytic B trace may be written as the sum of its in-phase component, $B_{in}$ and its quadrature component, $B_q$, with respect to a:

$$B = B_{in} + B_q$$

The in-phase and quadrature component are further expressed as follows:

$$B_{in} = Re\{AB^*\}/A^*$$

$$B_q = Im\{AB^*\}/A^*$$

where $A^*$ and $B^*$ are the complex conjugates of the analytic A and B traces. Note that the real part of the in-phase component of the analytic B trace may be written as:

$$Re\{B_{in}\} = Re\{AB^*\}Re\{1/A^*\}$$

Thus the in-phase component of the analytic B trace is obtained by forming the product of two factors. The first factor is the real part of the product of the analytic A trace multiplied by the complex conjugate of the analytic B trace. The second factor is the real part of the quotient of unity divided by the complex conjugate of the analytic A trace.

Through these calculations, the real parts of the analytic A and in-phase analytic B trace can be determined and plotted as discussed above. We believe this method is preferred and will result in the most accurate direct indication of hydrocarbon according to the present invention.

Various methods may be used to generate displays similar to conventional seismic sections or well logs for interpretation purposes. Each depth or time sample point on FIG. 2 can be assigned a numerical value corresponding to its deviation from line 20. A curve can then be generated by plotting each of these numerical values in its sequential time sample position to generate a continuous curve where the larger values would indicate the presence of hydrocarbons. Either the absolute values of the deviations can be plotted or both positive and negative values can be assigned. In either case, the maximum excursions of such a plot would indicate the presence of hydrocarbons.

Quite often it is desirable to overlay hydrocarbon indicator displays on top of conventional seismic sections. This is often done by use of a color scale printed on top of the typical black line on white background seismic traces. In the present invention, the deviation of each sample point shown in FIG. 2 from trend line 20 can easily be converted to a color scale. Thus, points on or near line 20 may be plotted on the blue end of the scale, while points which deviate the greatest may be plotted on the red end of the scale with intermediate colors assigned at points at intermediate locations. The assigned color values can then be plotted at the corresponding time sample or depth sample locations on the seismic section as direct indicators of the presence of hydrocarbons.

Another method for assigning values is to simply select a deviation from regression line 20 which is considered "abnormal". Points lying beyond the preselected deviation can be assigned values or colors classifying them as hydrocarbon indicators while all points lying within the deviation can be assigned values or designated as non-hydrocarbon indicators. In FIG. 2, two dash lines 22 and 24 have been drawn parallel to the regression line 20. In an interactive workstation environment, these dash lines may be selected by an operator based on observations of the cross plots. Alternatively, the deviation which is considered abnormal may be automatically selected based on some average spread of the cross plotted points. Having made the selection of deviation lines 22 and 24, either numerical or color values can be assigned. For example, all of the plotted points lying between the deviation lines 22 and 24 may be given the color blue, while all points lying outside may be given the color red. As discussed above, the assigned color values may then be displayed in their corresponding time location on a conventional seismic plot to provide a direct indication of the presence of hydrocarbons.

Since the data of FIG. 3 is the same as that shown in FIG. 2, the same or similar display methods can be used. The primary difference is to ignore or delete the points in the upper left and lower right quadrants. As suggested above, the new AB products of the points can be plotted as has been done with the data before rotation. If the simple two color plot approach is selected, the points which lie in the upper right and lower left quadrants and which also are located beyond deviation lines 22 and 24 would be given one color, while all other points are given a contrasting color.

While the present invention has been illustrated and described with reference to particular methods of analysis and displays, it is apparent that various modifications can be made thereto within the scope of the present invention as defined by the appended claims.

What is claimed is:

1. A method for displaying a seismic trace to indicate the presence of hydrocarbons comprising:
   selecting from common midpoint seismic data a gather of traces having a common midpoint;
   performing a normal move out correction of the gather of traces;
   calculating a zero offset reflectivity, or A, trace and an amplitude versus offset slope, or B, trace from the corrected gather;
   cross plotting each time sample value of the A trace against the corresponding time sample value of the B trace;
   determining the regression line of the cross plotted A and B samples;
   assigning a value to each time sample proportional to the deviation of said sample from said regression line;
   plotting said assigned values in their sequential time sample positions, whereby said plot provides an indication of hydrocarbons.

2. A method according to claim 1 wherein each time sample is assigned a numerical value proportional to said deviation and said values are plotted as a continuous curve.

3. A method according to claim 1, further including:
   calculating analytic traces for each of the zero offset reflectivity, A, and amplitude versus offset slope, B, traces;
   selecting the real part of the analytic A trace as the time sample value to the A trace; and,
   selecting the real part of the in phase analytic B trace as the time sample value of the B trace.

4. A method for displaying a seismic trace to indicate the presence of hydrocarbons comprising:
   selecting from common midpoint seismic data a gather of traces having a common midpoint;
   performing a normal move out correction of the gather of traces;
   calculating a zero offset reflectivity, or A, trace and an amplitude versus offset slope, or B, trace from the corrected gather;

cross plotting each time sample value of the A trace against the corresponding time sample value of the B trace;

determining the regression line of the cross plotted A and B samples;

rotating the cross plotted A and B samples about the origin to place the average regression line on the B axis;

assigning a value to each time sample which is, after rotation, located in the upper left or lower rights quadrants proportional to the deviation of said sample from said regression line; and, plotting said assigned values in their sequential time sample positions, whereby said plot provides an indication of hydrocarbons.

5. A method according to claim 4, further including:

calculating analytic traces for each of the zero offset reflectivity, A, and amplitude versus offset slope, B, traces;

selecting the real part of the analytic A trace as the time sample value to the A trace; and, selecting the real part of the in phase analytic B trace as the time sample value of the B trace.

6. A method for displaying a seismic trace to indicate the presence of hydrocarbons comprising:

selecting from common midpoint seismic data a gather of traces having a common midpoint;

performing a normal move out correction of the gather of traces;

calculating a zero offset reflectivity, or A, trace and an amplitude versus offset slope, or B, trace from the corrected gather;

cross plotting each time sample value of the A trace against the corresponding time sample value of the B trace;

determining the regression line of the cross plotted A and B samples;

rotating the cross plotted A and B samples about the origin to place the average regression line on the A axis;

assigning a value to each time sample after rotation, equal to the AB product; and, plotting said assigned values in their sequential time sample positions, whereby said plot provides an indication of hydrocarbons.

7. A method according to claim 6, further including:

calculating analytic traces for each of the zero offset reflectivity, A, and amplitude versus offset slope, B, traces;

selecting the real part of the analytic A trace as the time sample value to the A trace; and, selecting the real part of the in phase analytic B trace as the time sample value of the B trace.

* * * * *